(12) United States Patent
Chung et al.

(10) Patent No.: US 10,749,923 B2
(45) Date of Patent: Aug. 18, 2020

(54) CONTEXTUAL VIDEO CONTENT ADAPTATION BASED ON TARGET DEVICE

(71) Applicant: Apple Inc., Cupertino, CA (US)

(72) Inventors: Chris Y. Chung, Los Altos, CA (US);
Hsi-Jung Wu, San Jose, CA (US);
Xiaosong Zhou, Campbell, CA (US);
Jae Hoon Kim, Cupertino, CA (US);
Jingteng Xue, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 409 days.

(21) Appl. No.: 15/169,641

(22) Filed: May 31, 2016

(65) Prior Publication Data

US 2016/0359937 A1 Dec. 8, 2016

Related U.S. Application Data

(60) Provisional application No. 62/172,785, filed on Jun. 8, 2015.

(51) Int. Cl.
| | |
|---|---|
| G06F 15/16 | (2006.01) |
| H04L 29/06 | (2006.01) |
| H04W 88/02 | (2009.01) |
| H04N 21/2668 | (2011.01) |
| G11B 27/034 | (2006.01) |

(Continued)

(52) U.S. Cl.
CPC .......... *H04L 65/602* (2013.01); *G11B 27/034* (2013.01); *H04L 65/4069* (2013.01); *H04N 21/23439* (2013.01); *H04N 21/234363* (2013.01); *H04N 21/25825* (2013.01); *H04N 21/2668* (2013.01); *H04W 88/02* (2013.01)

(58) Field of Classification Search
CPC . H04L 65/602; H04L 65/4069; G11B 27/034; H04N 21/234363
USPC ........................................................ 709/219
See application file for complete search history.

(56) References Cited

U.S. PATENT DOCUMENTS

| | | | |
|---|---|---|---|
| 8,832,226 B2 | 9/2014 | Harnevo et al. | |
| 2003/0163828 A1* | 8/2003 | Agnihotri | .......... H04N 5/44543 725/113 |

(Continued)

OTHER PUBLICATIONS

International Preliminary Report on Patentability from PCT/US2016/035975, dated Dec. 21, 2017, Apple Inc., pp. 1-9.

(Continued)

*Primary Examiner* — Atta Khan
(74) *Attorney, Agent, or Firm* — Fish & Richardson P.C.

(57) ABSTRACT

Methods and apparatus for contextual video content adaptation are disclosed. Video content is adapted based on any number of criteria such as a target device type, viewing conditions, network conditions or various use cases, for example. A target adaptation of content may be defined for a specified video source. For example, based on receiving a request from a portable device for a live sports feed, a shortened and reduced resolution version of the live sport feed video may be defined for the portable device. The source content may be accessed and adapted (e.g., adapted temporally, spatially, etc.) and an adapted version of content generated. For example, the source content may be cropped to a particular spatial region of interest and/or reduced in length to a particular scene. The generated adaptation may be transmitted to a device in response to the request, or stored to a storage device.

20 Claims, 7 Drawing Sheets

(51) Int. Cl.
H04N 21/2343 (2011.01)
H04N 21/258 (2011.01)

(56) References Cited

U.S. PATENT DOCUMENTS

| | | | | |
|---|---|---|---|---|
| 2006/0026302 A1* | 2/2006 | Bennett | ............ | H04L 29/06027 |
| | | | | 709/246 |
| 2008/0123741 A1* | 5/2008 | Li | ........................ | H04N 19/102 |
| | | | | 375/240.12 |
| 2010/0131993 A1 | 5/2010 | Sanitate et al. | | |
| 2010/0146055 A1* | 6/2010 | Hannuksela | ......... | G11B 27/034 |
| | | | | 709/206 |
| 2010/0183243 A1* | 7/2010 | Brand | ................... | G06T 3/0093 |
| | | | | 382/282 |
| 2012/0054809 A1* | 3/2012 | Chowdhury | ....... | H04N 21/2223 |
| | | | | 725/93 |
| 2012/0317299 A1* | 12/2012 | Sathianathan | ..... | H04N 21/2343 |
| | | | | 709/231 |
| 2012/0324491 A1 | 12/2012 | Bathiche et al. | | |
| 2013/0050574 A1* | 2/2013 | Lu | ...................... | G06K 9/00751 |
| | | | | 348/441 |
| 2014/0147096 A1 | 5/2014 | Fauqueur et al. | | |
| 2014/0160143 A1 | 6/2014 | Ballestad et al. | | |
| 2015/0117524 A1* | 4/2015 | Rondao Alface | .... | H04N 19/187 |
| | | | | 375/240.08 |
| 2016/0269645 A1* | 9/2016 | Khoe | ................. | H04N 5/23293 |

OTHER PUBLICATIONS

International Search Report and Written Opinion from PCT/US2016/035975, dated Sep. 7, 2016, Apple Inc., pp. 1-12.

* cited by examiner

CONTEXTUAL VIDEO CONTENT ADAPTATION BASED ON TARGET DEVICE

This application claims benefit of priority to U.S. Provisional Patent Application No. 62/172,785, filed Jun. 8, 2015, titled "Contextual Video Content Adaptation Based on Target Device," which is hereby incorporated by reference in its entirety.

BACKGROUND

Technical Field

This disclosure relates generally to video content adaptation, and in particular to improved video content adaptation techniques based on various criteria such as presentation device type, viewing conditions, network conditions and/or various use cases.

Description of the Related Art

Video content may be generated for presentation in a particular manner. For example, movies are generated for presentation on a large screen such as a wide screen format for movie theatres or widescreen televisions. Content that is generated for presentation in a particular manner may provide a low-quality experience when the content is presented in some other manner that what was intended. For example, video content generated for presentation on a larger screen may be difficult to view on smaller displays, such as a video-enabled watch.

Furthermore, other characteristics of devices, such as battery power may place further limitations on characteristics of the content that is appropriate for display by the device. A video-enabled watch may be limited to a shorter amount of display time than a PC or television, due to battery power, for example.

SUMMARY OF EMBODIMENTS

Embodiments of the present disclosure describe systems, devices and processes for improved contextual video content adaptation based on a number of criteria such as a target device type, viewing conditions, network conditions, or various use cases. In some embodiments, one or more target adaptations of content may be determined for a specified video source. The video content source may be accessed and adaptations (e.g., temporal, spatial, etc.) of the content determined, based on the target. An adapted version of the video content may be generated, based on the content adaptations, and the adapted version of the content output to storage or to a device, for example.

These and other features and advantages will become apparent to those of ordinary skill in the art in view of the following detailed descriptions of the approaches presented herein.

Figure 1:
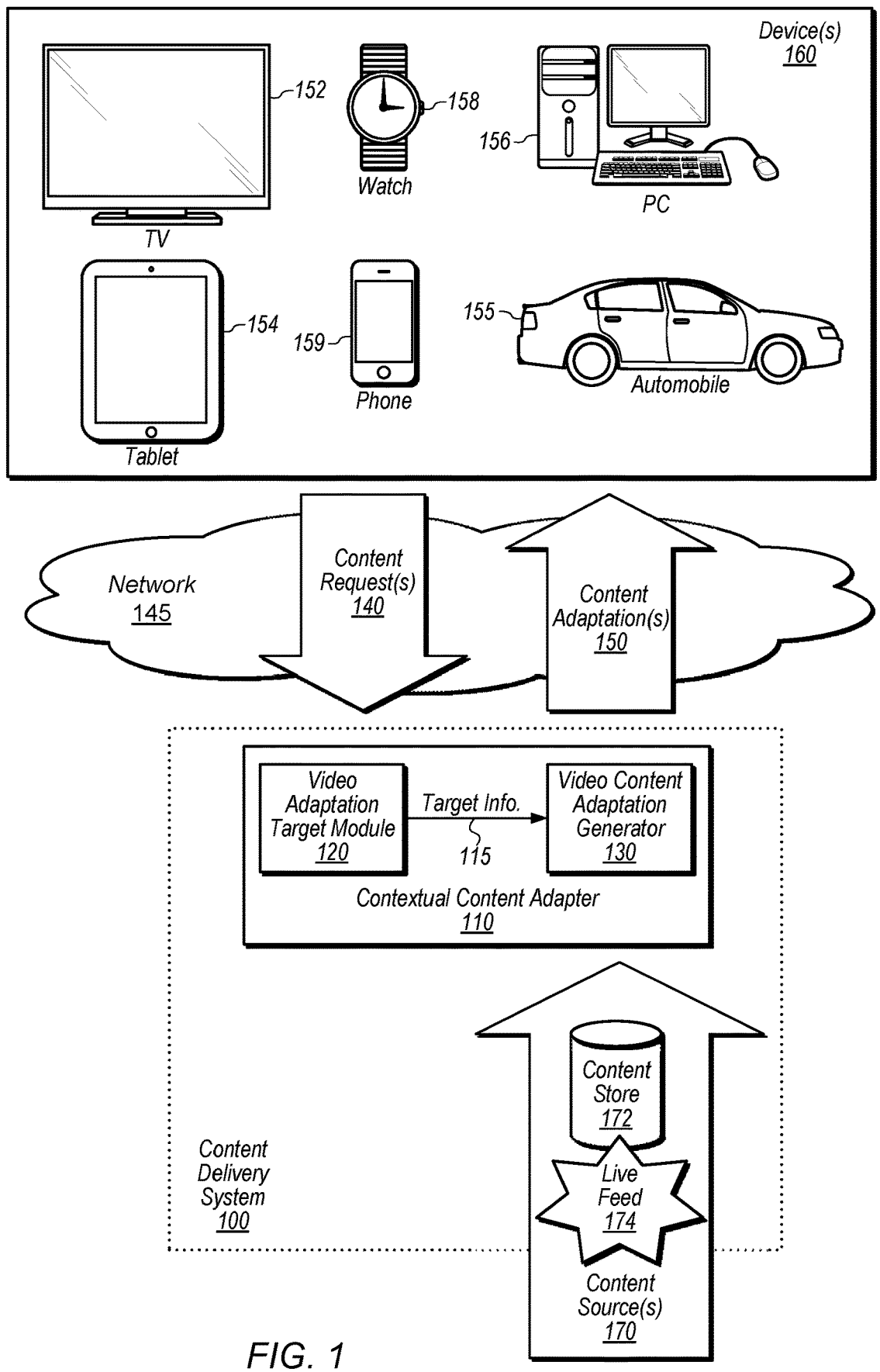
FIG. 1 illustrates a system for contextual video content adaptation based on a target device, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g. a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of a device, system and method for a process of contextual video content adaptation based on various criteria such as a target device are described.

Content may be captured and stored in a form that is not appropriate for all device types, viewing conditions, network conditions or use cases. Content may be too lengthy in duration, contain too much content, or may include too little or too much information for a satisfactory user experience. For example, movies formatted for presentation at movie theatres are frustrating to view on smaller screens such as smart phones or video-enabled watches, at least because the display is so small that images are difficult to follow and because the battery life of some such devices limits the amount of content that may be viewed.

Embodiments disclosed herein describe techniques to determine a target content adaptation for a specified video source, access the specified content video source, determine adaptations to be performed on the content source, and generated an adapted version of the video content.

For example, the content source may be adapted temporally or spatially. In some embodiments, the adaptation may alter characteristics of the content rather than characteristics of how the content is delivered. For instance, instead of changing the bit-rate or resolution or playback speed (e.g., for different devices, or based on a lack of bandwidth) the length of the content itself may be shortened (e.g., portions of the beginning, end, or other segments of the content may be removed) or presentation may be limited to some portion of the frame (e.g., presentation of a soccer game may be cropped to focus on the ball or a player).

The adaptation of source may be performed offline (e.g., prior to a request), may be performed on a single video content at a time, or on a group of video (e.g., related videos, sequels, series, related topics) to produce a summary video, for example. In some embodiments, the adaptation may be performed in real-time or near-real-time with the request or with the capture of the video. For example, an IP-based security camera may crop an area of interest that shows movement and send the area of interest to a display on a video-enabled watch.

In some embodiments, the analysis components, circuitry, systems and methods described herein may be implemented as part of various devices, including but not limited to, servers or other components of a content delivery system that have content storage and/or delivery capability, for example.

In some embodiments, the presentation components, circuitry, systems and methods described herein may be implemented as part of various devices, including but not limited to, video-enabled watches, mobile phones that have video capture or video streaming functionality, tablet computing devices, personal video recording devices, PCs, laptops, television, automobile entertainment systems, and/or other computing devices. A user of these devices may interact with a contextual video content adaptation application capable of performing the functionality described herein such that a content source may be adapted for presentation on various devices.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Attention is now directed toward embodiments of a contextual content adapter that provides contextual video content adaptation based on various criteria such as the type of target device. FIG. 1 illustrates a content delivery system 100 that includes a contextual content adapter 110 that receives requests for content and provides adapted content 150 to the requesting device 160. In various embodiments, contextual content adapter 110 may perform the processes described herein, for example the processes illustrated in FIGS. 2, 4, 5A, and 5B. In the illustrated embodiment, contextual content adapter 110 receives source content 170. Contextual content adapter 110 may obtain the source content from a content store 172, or part of a live feed 174, for example, although other content sources are contemplated as well.

Contextual content adapter 110 is illustrated with video adaptation target module 120 and video content adaptor generator 130. The video adaptation target module 120 may receive content requests 140 (e.g., via network 145) and define one or more target content adaptations for a specified video source. In some embodiments, the video source may be specified in the content request 130. Subsequent to defining the one or more target content adaptations for a specified video source, the video adaptation target module 120 may send corresponding target information 115 to the video content adaptation generator 130. Target information 115 may include an identifier or data that describes the target content adaptation that was determined for the specified video source.

The video content adaptation generator 130 may access the video source (e.g., content source(s) 170) and determine, based on the determined adaptation targets, temporal or spatial adaptations to the video content of the video source. The video content adaptation generator 130 may generate, based on the temporal or spatial adaptations, an adapted version of the video content. Adapted content 150 may differ from the source content in one or more temporal or spatial video characteristics. The adapted content 140 may be stored to a data store or sent to the requesting device 160, in embodiments. In some embodiments, the requesting device and the receiving device may be distinct devices. For example, a phone may be used to request content and the content may be delivered to a video-enabled watch or a television.

The content requesting or content receiving device may be any device capable of making requests for content and receiving content. A non-exhaustive list includes TV 152, video-enabled watch 156, PC 156, tablet 154, phone 159 and automobile 155. In embodiments, the process of requesting and receiving content may be performed entirely within a device. In some instances, a component of a device may request and receive content from another component of the same device. A smart phone may capture video, store the video (adapted or not), and provide adapted content to a requesting process of the smartphone, for example. In embodiments, the request or content may be transmitted across any medium such as memory, network(s), or intermediate devices.

Various embodiments may include other types of content such as audio content or an e-book and corresponding metadata. In embodiments, metadata may include any of the various types of metadata as are well known to one of skill as well as those described herein.

Contextual content adapter 110 is illustrated with video adaptation target module 120 and video content adaptation generator 130. Embodiments may include more or less components than those disclosed and various embodiments are contemplated where the components are arranged other than in the manner disclosed. Such embodiments do not depart from the scope of this disclosure.

Figure 2:
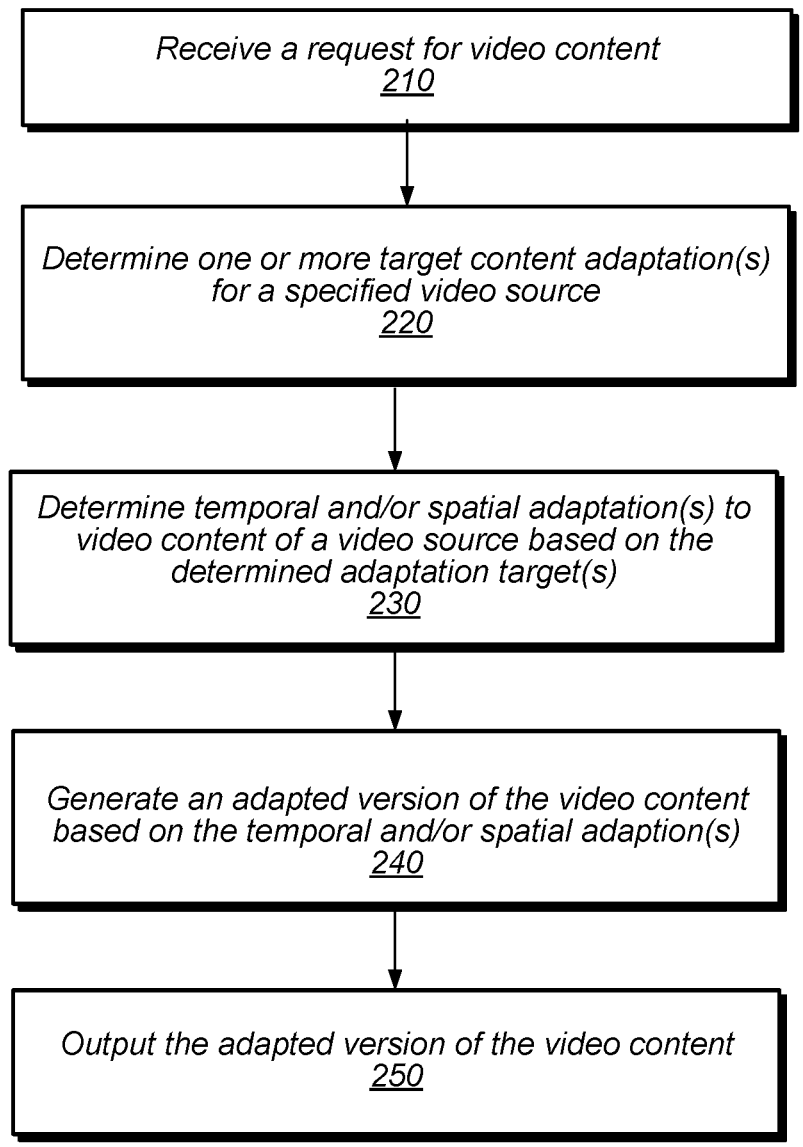
FIG. 2 is a flow diagram of a process of contextual video content adaptation based on a target device, according to some embodiments.

FIG. 2 illustrates a contextual video content adaptation process that may be performed by one or more modules of the contextual content adapter 110. At block 210, a request for video content is received (e.g., from a requesting device 160). A video application on a smartphone 159 may make a request 140 for content, or a video-enabled watch 158 may request 140 video content. At block 220, one or more adaptation targets for a specified video source may be determined. For example, the video adaptation target module 120 may determine, based on a determination that the request came from a video-enabled watch, that a shortened and cropped version of a source content may be appropriate. In at least some embodiments, the target module 120 may define a target content adaptation that is used to determine particular modifications to be performed on the source content.

At block 230, temporal or spatial adaptations to the video content of a video source may be determined based on the determined adaptation target. For example, the video content adaptation generator 130 may determine which segments (e.g., frames or scenes) of the content to eliminate in order to shorten the length of the video, or the video content generator may determine which portion(s) of frame(s) or scene(s) to crop to fit to the smaller presentation screen.

In embodiments, adaptations to the video content may be determined by applying rules of a policy. For instance, the rules captured in a policy may be applied to content metadata (e.g., to content metadata provided by a studio or to results of content analysis). The policy may be associated with the request (e.g., with the device or user configuration information of the requesting user or directly with the requesting user) or the policy may be determined based on attributes of the requesting user, in embodiments. For example, respective policies associated with certain age groups may be applied to provide content appropriate for that age group, in accordance with the user configuration information associated with the requesting device. In some embodiments, the contextual content adapter 110 may include one or more modules that identify characteristics (e.g., age, etc.) of the user associated with the request and apply the rules of a policy associated with those characteristics when generating the adapted content. For instance, the contextual content adapter may generate an adapted version of the video content in accordance with a PG rating for a user that is identified to fall within that age group.

At block 240, an adapted version of the video content is generated, based on the temporal and/or spatial adaptation(s). For example, the video content adaptation generator 130 may be configured to generate the adapted version of the video content. At block 250, the adapted version of the video content is output. For example, the video content adaptation generator 130 may send the adapted content to a device (e.g., the requesting device 160) or may send the adapted content to storage in a data store.

Figure 3:
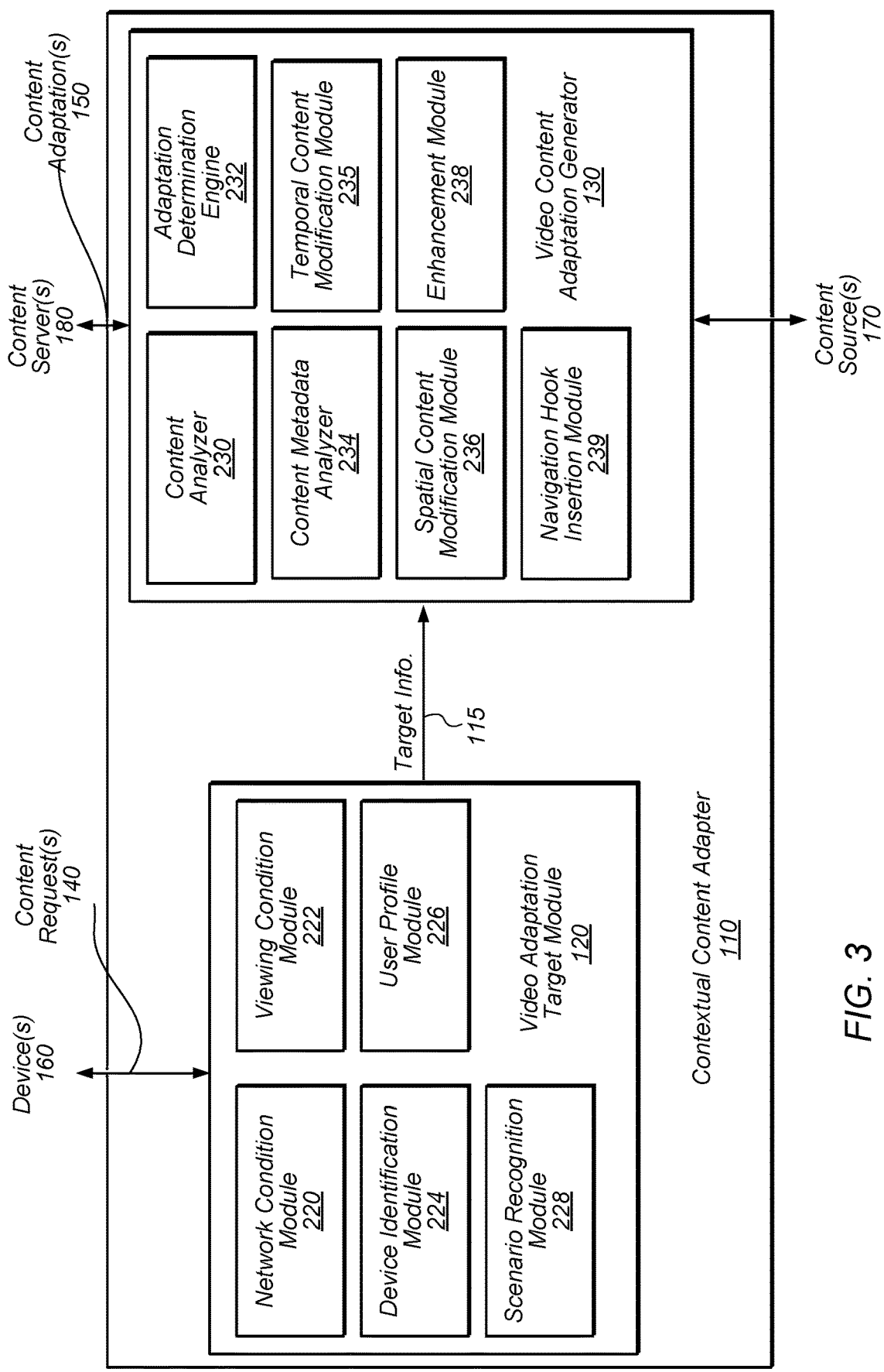
FIG. 3 is a block diagram of a contextual content adapter, according to some embodiments.

FIG. 3 is a block diagram of a contextual content adapter, according to some embodiments.

The video adaptation target module 120 is illustrated receiving content requests 160 from devices 160. The video adaptation target module 120 is depicted with network condition module 22, viewing condition module 222, device identification module 224, user profile module 226 and scenario recognition module 228.

The network condition module 220 may determine the condition of a network based on communications with and/or over the network or may determine the condition of the network based on data in the received request, for example. The viewing condition module 222 may determine the viewing conditions from data in the request, in embodiments. For example, the requesting device 160 may sense the ambient light where the device is located and include an indication of the ambient light level in the request as an indication of the viewing conditions. In some embodiments, the GPS location of the device may be used by the viewing condition module 222 to determine a location of the requesting device (e.g., at home, near a Wi-Fi network, in a stadium, etc.) to determine an associated viewing condition. Viewing conditions may be tracked by location and associated with characteristics in a user profile, for example. Viewing conditions may include day/night, indoor/outdoor for example.

The device identification module 224 may be configured to determine the type of device making the request or the type of device the content is to be presented on. The device type may be determined from information in the request 140 or in response to a separate query of the device, or based on a user profile, for example.

User profile module 226 may generate user profile information, or may obtain user profile information (e.g., from the device, from a distinct application, such as a social media account or based on user input to create the user profile). The user profile may be stored to a data store that may be queried by the user profile module to provide user profile information to the other modules of the contextual content adapter 110.

Video adaptation target module 120 is illustrated with user profile module 226. In embodiments, the user profile module 226 may obtain social data, historical user selections, user-configurable user preferences, or the like. For example, the social data may be obtained or received from a social networking website; the historical editing selections might be obtained from past user selections for navigating or summarizing video and user configurable user preferences may be obtained via a user interface for the device that includes the contextual video content adaptation application. In embodiments, the information stored or obtained by the with user profile module 226 may be used to generate personalized video summaries, as described herein. For example, if the configurable user preferences describe that the user prefers summary videos of a particular length, the video adaptation target module 120 may automatically instruct generation of video of that length or if the user has a history of only including scenes with faces in summaries, the summarization tool may only generate summaries with scenes that include faces.

Scenario recognition module 228 may determine one or more preprogrammed scenarios and include an indication of the scenario in the target information 115. For example, various groupings of the data from the modules 220-226 may be recognized as a scenario. For instance, a morning request from a video-enabled watch that is associated with a user profile that indicates a history of viewing radar weather information in the morning may be associated with a morning radar report scenario. When this scenario is communicated in the target information 115 to the video content adaptation generator 130, the adaptation engine may apply the morning radar report scenario to the content such that a video report of the morning weather is cropped down to just the radar image. Scenarios may be composed of any of various combinations of the data gathered by modules 220-226 such as whether a particular scenario indicates whether the requesting user has limited time or more time, for example.

In another example, a request from a video-enabled watch that is located in a soccer stadium during a soccer match may be associated with a local sports replay scenario. When this scenario is communicated in the target information 115 to the video content adaptation generator 130, the adaptation engine may apply the local sports replay scenario to content associated with the soccer match to crop a video of the latest score down to the portion of the frames that are associated with a player indicated in the user's viewing profile.

The video content adaptation generator 130 is illustrated with various modules that determine the adaptation, analyze the content and metadata, and modify the content source to generate adapted content that is suitable for a device, or scenario, for example.

Adaptation determination engine 230, determines the adaptations that should be performed, based on the target information. For example, the engine 230 may determine the length that the content should be shortened/lengthened to, or what part of a scene or frame should be cropped or where the content should be enhanced. The adaptation determination engine 230 may determine if the content is suitable for arrangement as an eBook, in embodiments.

Content analyzer 232 analyzes the content as described herein. For example, prioritizing scenes or frames or other segments of video. The ranking may be performed based on any of various criteria, such as audio, closed captioning analysis, region of interest analysis, or the like.

In embodiments, one or more of the modules of the video content adaptation generator 130 may receive frame data and corresponding metadata, analyze the data and/or the metadata with various tools (e.g., based on the techniques disclosed herein) and perform various processes on the content of the video source.

One of the illustrated tools is an undesirable content remover (e.g., implemented by the temporal content modification module 235 or the spatial content modification module 236) which may, in embodiments, automatically remove undesirable portions of video content. For example, prioritization of groups (e.g., performed by content analyzer 232) may be used to automatically remove the least desirable segments while allowing an arbitrary length video to be generated (e.g., as a summary or highlights video). Prioritization may also be used to provide navigation hooks for navigating past segments that are likely to be undesirable.

There are many aspects of what can be considered undesirable in a video sequence. Processes disclosed herein may allow automatic prioritization and elimination of certain portions of the video, based on classifications. As an example, either modification module 235/236 may remove some percentage or amount of a sequence classified as most undesirable or alternatively may always choose to remove any video below a certain quality threshold.

Another example technique that may be used to remove undesirable video is to analyze the motion from the gyroscope and accelerometer. Scenes which have widely varying motion (due to a shaky camera or unintentional recording) can be marked with a hook or removed automatically, in embodiments. For example, the content analyzer 232 and/or metadata analyzer 234 may obtain indications of widely varying motion Another example technique is to analyze the video for bad exposure. Over-exposed scenes, under-exposed scenes, and scenes in which the exposure changes too quickly can all be marked or removed, in embodiments. The digital gain, analog gain, scene luminance, and variance of the scene luminance throughout the scene may be used to determine bad exposure. Exposure can also be tied to scene position, determined by gyroscope and motion analysis, in order to eliminate widely fluctuating exposure within a single position, in embodiments. For example, the content analyzer 232 and/or metadata analyzer 234 may obtain indications of poor exposure.

Another example technique is to remove static scenes which contain almost no changes in video or audio. Scenes which contain almost no entropy in video or audio can be significantly shortened, in embodiments. Also, scenes which contain very low picture entropy or which are very blurry can also be classified for possible removal or automatically removed, in embodiments. In some instances, a focus score can be utilized to determine scenes in which a camera focus sweep was occurring and these scenes can also be removed or marked for removal. The content analyzer 232 and/or metadata analyzer 234 may obtain indications of static scenes, for example.

Content analyzer 232 may include a content rank tool that may automatically provide ranking, grading or scoring of content. For example, video segments or groups may be prioritized and receive a score for how likely the segment is to be undesirable or unintentional. This score/prioritization can be used as an auto-removal technique. A second score/prioritization can also be used to determine the priority of clips in an auto-generated summary clip, in embodiments. This can allow automatic flexibility in the creation of an arbitrary length summary clip, for example.

Content analyzer 232 may include a scene detection tool that may automatically provide detection and/or classification of scenes in the video. For example, scenes which are obstructed by an unintentional object may be detected and classified for possible removal. This could include an accidental finger covering part of the lens or a person or object temporarily obstructing the camera view, for example. Additionally, or alternatively, scenes with audio (e.g., significant amounts of audio or talking in particular) may be detected and classified such that they are given a higher priority and are less likely to be removed, in embodiments.

Scene-detection can be used to determine where scene breaks are to assist in representing most of the scenes of a sequence. Both video and audio scene breaks can be determined and used, in embodiments. Motion analysis (e.g., using the gyroscope and accelerometer) and/or video content analysis can help determine what should be classified as a single scene, in embodiments. Voice-analysis can also be used to determine who is talking at a particular time and allow scene-breaks based on the speaker, in some instances. Other audio analysis can determine the duration and starting/ending point of certain audio signal captured in the video sequences, in embodiments. Video/audio characteristics generated from analysis may be used to group video segments together. In some embodiments, the classification of video segments can be illustrated or displayed visually in order to aid video editing.

Content analyzer 232 may include a scene/segmentation navigation tool that may automatically provide scene navigation. For example, once portions/scenes of the video have been identified, the navigation tool may provide user interface elements (e.g., navigation hooks) that provide navigation among the portions/scenes. The navigation may be among portions of a summary video generated by the video content adaptation generator 130, in embodiments.

Adaptation determination engine 230 may include a summarization/highlights generator tool that may automatically suggest or provide summarization or highlight video based on the video content and video metadata. For example, the summarization/highlights generator tool may obtain or receive video prioritization and/or classification metadata and remove or organize portions of the video according to the metadata such that a reduced-length video is generated. In embodiments, the reduced-length video may include the important or most desirable scenes, as determined via the techniques described herein.

In some embodiments, it may be desirable to reduce a video to a specific size for compressing or sending over a network. There may also be a need for summarizing a video in such a way that most of the interesting parts of the video are well-represented, in embodiments. Both of these goals can be addressed with techniques described herein. For example, prioritization may be performed that classifies the value and length of each scene/group. A summary can then be generated which trims each scene/group down based on the determined importance. In the case where no fixed output size is used, the length of the summary can be determined by the amount/number of important scenes in the sequence, in embodiments.

In embodiments, a video summary may be generated based on considering three-dimensional information. For example, multiple images/videos of the same landmark may be captured from different viewpoints. The three-dimensional information of the landmark may be recovered (e.g., partially or wholly) using image-based analysis of the multiple images/videos and used for summarization, such as a summary video that depicts a three-dimensional representation of the landmark. Similar processes may be applied to objects other than landmarks, in embodiments.

Summarization may make use of synthesized frames, in embodiments. For example, intermediate frames may be synthesized using portions of high quality frames to replace portions of or entire low quality frames.

Content metadata analyzer 234 may obtain and/or analyze metadata associated with the source content. For example, studios may include metadata with the content as an indication that is helpful in ranking scenes or frames. For instance, an indication of adult language or violence in a particular scene may be indicated in the metadata. The adaptation engine 230 may determine to include or exclude the scenes associated with the metadata, based on the indicated scenario, for example.

Temporal content modification module 235 may modify the source content to generate a short or longer version of the source content. In some embodiments, the source content may be adapted to an eBook with audio.

Spatial content modification module 236 may make spatial alterations to the source content. For example, multiple regions of interest (ROI) may be cropped and combined.

Enhancement module 238 may be configured to enhance various portions or segments of the video content. For example, a scene filmed in 3D may be used to replace a scene from the source content in 2D. In another example, information from the 3D version of the content may be used to alter the viewpoint of the scene in the adapted content. The loudness of an interesting scene may be increased or the intensity (e.g., contrast) of the scene may be altered to suit the scene, in embodiments.

Navigation hook insertion module 239 may be configured to insert navigation hooks into the adapted content. For example, hooks may be inserted to facilitate jumping between related scenes.

Figure 4:
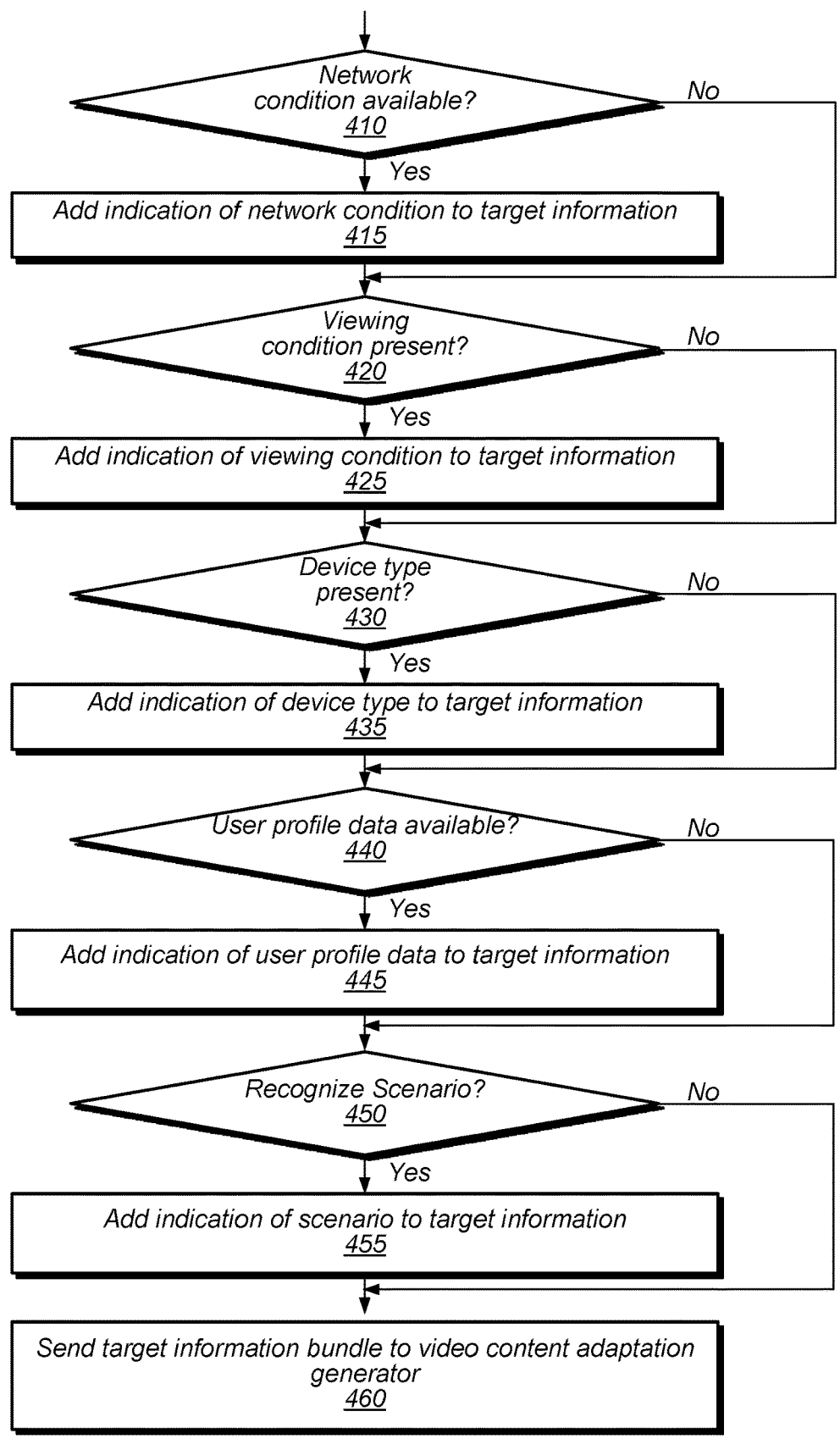
FIG. 4 is a flow diagram of a process for contextual video content adaptation, according to some embodiments.

FIG. 4 is a flow diagram of a process for contextual video content adaptation, according to some embodiments. The illustrated process may be performed by one or more component or modules of the contextual content adapter 110, for example, one or more modules of the video adaptation target module 120. The illustrated process describes how a target information bundle is determined and sent to a video content adaptation generator 460. The illustrated embodiment is an expansion on block 220 of FIG. 2, in embodiments.

If a network condition is available (block 410), an indication of the network condition is added to the target information (block 415). For example, the content request 140 may include an indication of the network condition, such as a range of available bandwidth, a maximum available data rate, an indication of a network latency and/or an indication of network loss, for example. The indication may be determined and included in the request by the requesting device, or may be determined by the network condition module 220, based on communication with the device or based on communication over the network, for example. Otherwise (410, no), the process skips from 410 to 420, where a determination of whether the viewing condition is present is determined. For example, the viewing condition may be determined by the requesting or presentation device and included in the content request, for example.

If the viewing condition is present, an indication of the viewing condition is added to the target information (block 425). Otherwise, (420, no) the process skips to 430, where if the device type is present (e.g., in the request or in a profile, etc.) an indication of the device type is added to the target information (block 435). Otherwise (430, no), the process skips to block 440, where if the user profile data is available, an indication of the user profile data is added to the target information (block 445). For example, the user profile data may be included in the request, or may be obtained by querying the requesting device for user profile information stored on the device, or may be obtained from a data store of user profiles on a server. Otherwise (block

440, no) the process skips to block 450, where if a scenario is recognized, an indication of the scenario is added to the target information (block 455). For example, the scenario recognition module 228 may analyze various contextual information, (e.g., the network condition, the viewing condition, the device type, the profile data, etc.) and determine that a particular scenario is applicable. For instance, if the request is from a video-enabled watch with a low battery and the device user's profile indicates an affinity for soccer, that request for content may produce recognition of a sports scenario targeting small screen devices that shortens and crops video clips of recent soccer games. At 460, the target information bundle is sent to the video content adaptation generator.

Figure 5A:
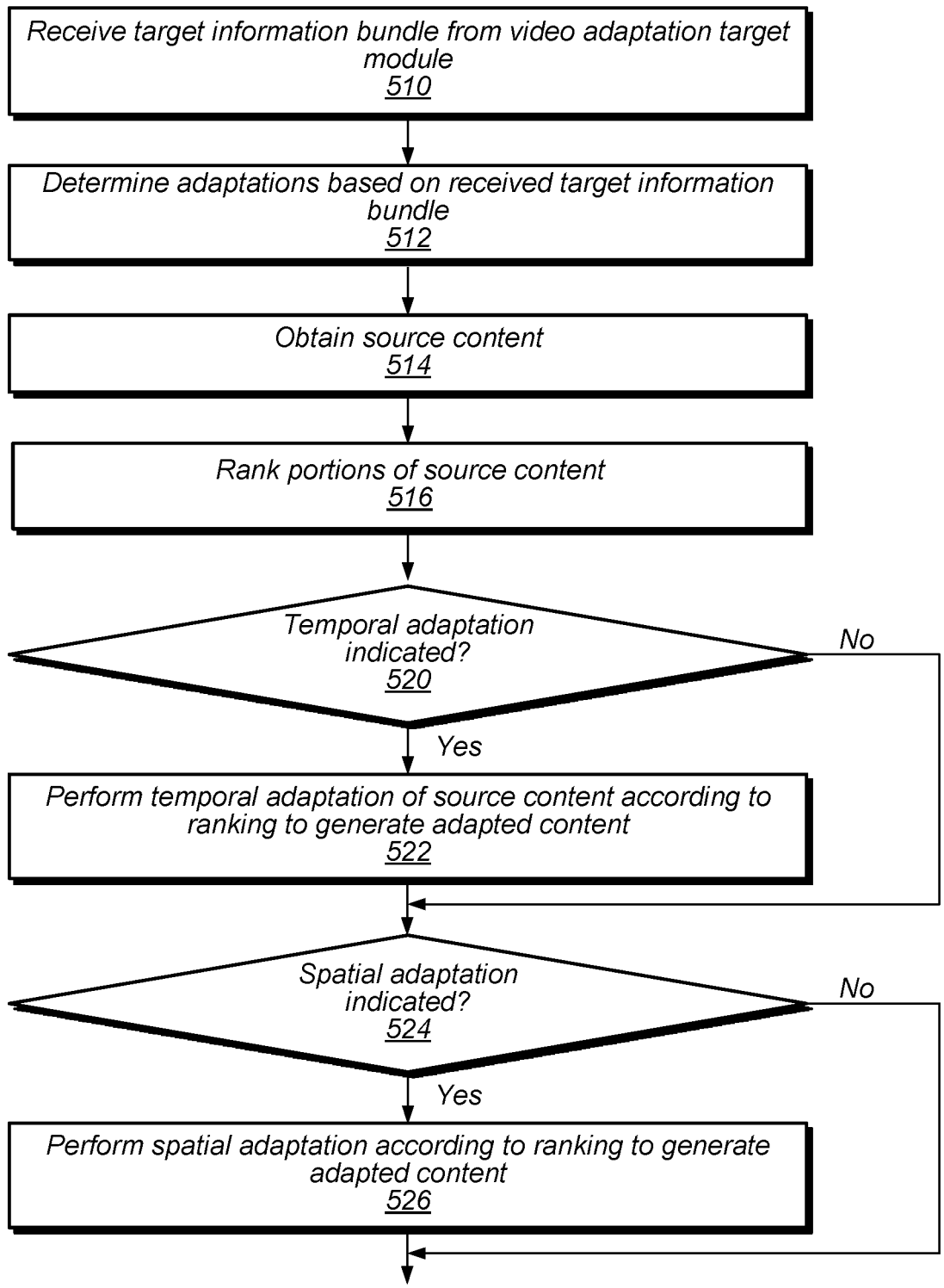
FIGS. 5A and 5B are flow diagrams of a process for contextual video content adaptation, according to some embodiments.
Figure 5B:
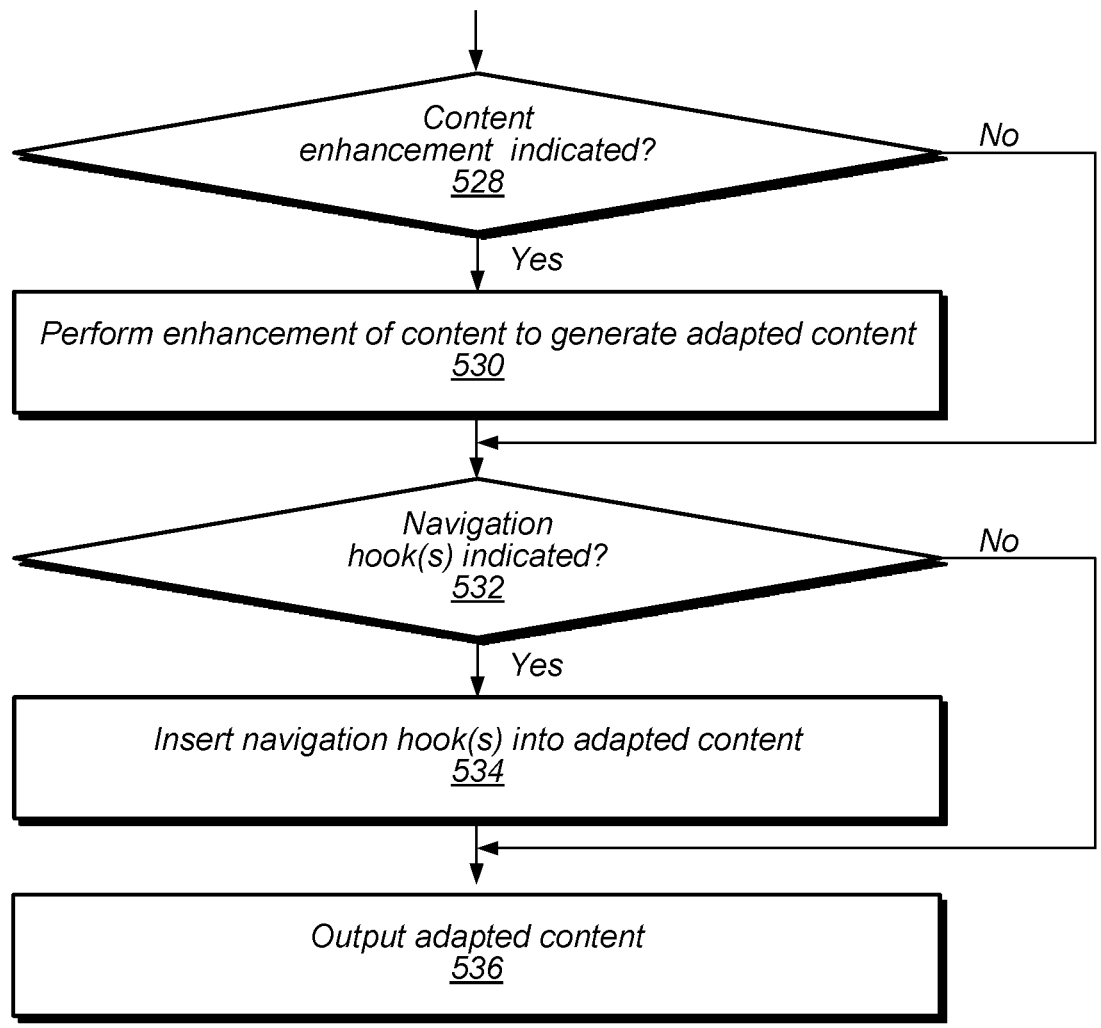

FIGS. 5A and 5B are flow diagrams of a process for contextual video content adaptation, according to some embodiments. The various elements of the process may be performed by one or more modules of the contextual content adapter 110, such as the video content adaptation generator 130, for example.

FIG. 5A illustrates that a target information bundle may be received from the video adaptation target module 120 (block 510). At 512, adaptations are determined based on the received target bundle. For example, adaptation determination engine 232 may receive the target information and determine the adaptations. For instance, the adaptation determination engine 230 may determine that the target information (e.g., target information that indicates that the requesting device is a watch) indicates that the length of the content should be no more than some threshold and that the content should be cropped down to the regions of interest in each frame or scene.

At 514, the source content is obtained, (e.g., from a content data store 172, or from a live feed 174) and at 516 portions of the content are ranked. For example, the content analyzer 232 may rank scenes, frames or portions of frames based on various criteria. In some instances, the ranking may be based on the quality of the video, the amount of action in the video, regions of interest such as where the action in the frame is located, or the like.

At 520, if a temporal adaptation is indicated, the temporal adaptation of the source content is performed according to the ranking in order to generate adapted content. For example, the temporal modification module 235 may modify the length of the content based on the ranking of scenes or frames. Otherwise (520, no) the process skips to 524 where if spatial adaptation is indicated, the spatial adaptation is performed (block 526) according to the ranking to generate adapted content (e.g., by spatial content modification module 236).

The process continues in FIG. 5B, where if content enhancement is indicated (block 528, yes) enhancement of the content is performed to generate adapted content. Otherwise (block 528, no) the process skips to block 532 where if navigation hooks are indicated, the navigation hooks are inserted into the adapted content. If navigation hooks are not indicated, the process skips to block 536, where the adapted content is output (e.g., to a content store or to the requesting device or to another device).

In various embodiments, the techniques described herein may be applied to still images or a combination of still images and video segments.

Based on different viewing devices, viewing condition/habit and use scenarios, the presentation of one or a group of videos may be adjusted adaptively. Several kinds of presentation can be generated for the same visual content offline or on the fly, including, full length video mode and video summaries of different lengths and different resolutions that summarizes videos in both time and space. In the case of summaries, temporally, a process may stitch together significant segments, potentially temporally scaled; while spatially, the process may look for one or more regions of interest and automatically crop, scale, and combine the ROIs to maximize the significance for the small screen. The ROIs are determined with temporal coherence in mind across frames, in embodiments.

One example is that when people browse videos on wearable devices, the displays may be smaller and the average viewing duration may be short; a summary of shorter length and adaptively cropped/scaled/composed content can be presented for a quick glance (news clips can be summarized and 'sped up', live sports can be viewed sporadically as high lights combined with a notification whenever something interesting happens, you can catch up on past episodes of shows via quick summaries on your device) in embodiments.

Another example is when people browse video library on the cloud. When the bandwidth is the bottleneck, a summary of the content can be downloaded and presented first.

Similarly, browsing videos via functionality with an application like QuickLook can be enhanced by showing a summarized version of videos.

With the presentation adaptation, movie experience with the same content can be greatly improved by creating several flavors. For example, special visual effects can be added to part of the movies (spatially and temporally) with cues from caption, audio (e.g., explosion), 3D movie (by analyzing depth info). Some of scenes from the corresponding 3D movie can also be mixed into the 2D movie.

The system can create a short version (or multiple short versions) of a movie based on the storyline or a character's view point by automatically crops, scales frames in both spatial and temporal directions.

Another example is to create a PG (or G) version from a PG-13 (or R) movie, to make it more family friendly and also shorter as needed.

The system can also create an eBook from a movie and let users add voice and commentary.

Short versions of a movie can also be made from sequels as they're closely connected (e.g., a short version covering all sequels or a version mixed with multiple sequels to help viewers remember/understand the store better), in embodiments.

Similar movies can also be mixed to create a mixed version of a theme. All of these flavors can be done by the studio or by the users in an interactive way, in embodiments.

Figure 6:
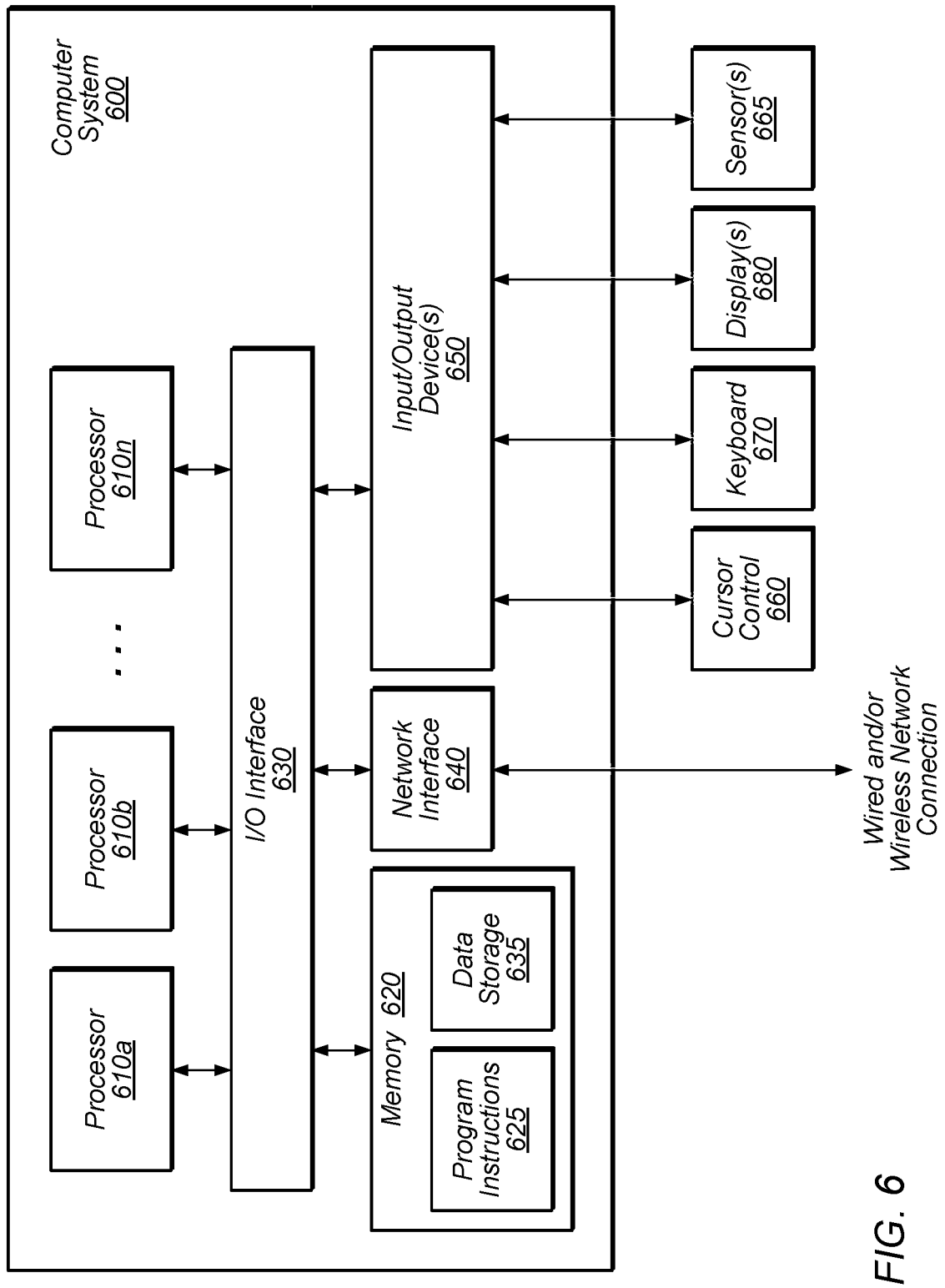
FIG. 6 is a block diagram illustrating an example computer system that implements some or all of the techniques described herein, according to different embodiments.

FIG. 6 illustrates computer system 600 that is configured to execute any or all of the embodiments described above. In different embodiments, computer system 600 may be any of various types of devices, including, but not limited to, a personal computer system, desktop computer, laptop, notebook, tablet, slate, or netbook computer, mainframe computer system, handheld computer, workstation, network computer, a camera, a video-enabled watch, a set top box, a mobile device, a consumer device, video game console, handheld video game device, application server, content server, storage device, a television, a video recording device, a peripheral device such as a switch, modem, router, or in general any type of computing or electronic device.

Various embodiments of a system and method for contextual video content adaptation based on criteria such as a target device, as described herein, may be executed on one or more computer systems 600, which may interact with various other devices. Note that any component, action, or functionality described above with respect to FIGS. 1-5 may be implemented on one or more computers configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, display(s) 680, sensor(s) 665 (e.g., motion and/or image sensor(s)). In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g. two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions 625 and/or data 635 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions 625 may be configured to implement a contextual video content adaptation application incorporating any of the functionality described above. Additionally, data storage 635 of memory 620 may include video content and video metadata, including any of the information or data structures described above, including but not limited to video images or frames and corresponding metadata used in implementing the techniques described herein. In some embodiments, program instructions and/or data may be received, sent or stored upon different types of computer-accessible media or on similar media separate from system memory 620 or computer system 600. While computer system 600 is described as implementing the functionality of functional blocks of previous Figures, any of the functionality described herein may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g. system memory 620) into a format suitable for use by another component (e.g. processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g. carrier or agent devices) or between nodes of computer system 600. The network may in various embodiments include one or more networks including but not limited to Local Area Networks (LANs) (e.g. an Ethernet or corporate network), Wide Area Networks (WANs) (e.g. the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 625, which may be processor-executable to implement any element or action described above. In one embodiment, the program instructions may implement the methods described above, such as the methods illustrated by FIGS. 2, 4, 5A, and 5B. In other embodiments, different elements and data may be included. Note that data 635 may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g. as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g. disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
   one or more processors; and
   memory comprising program instructions that are executed by the one or more processors to implement:
      a video adaptation target module configured to define, in response to a request received over a network from a requesting device for video content, one or more target content adaptations for a specified video source, based at least in part on one or more characteristics of the requesting device and one or more ambient viewing conditions at the target device; and
      a video content adaptation generator configured to:
         access the video content source;
         determine, based at least in part on the one or more defined target content adaptations, temporal and spatial cropping adaptations to the video content of the video source, wherein a temporal cropping adaptation alters a duration of at least a portion of the video content;
         generate, based on the temporal and spatial cropping adaptations, an adapted version of the video content, wherein the adapted version differs from the source content in temporal and spatial video characteristics; and
         responsive to the request for the content, output the adapted version of the video content over the network.

2. The system as recited in claim 1, wherein the one or more processors further implement a content delivery system configured to transmit the adapted version of the video content to the source of the request for the content, wherein said access the video, said determine temporal and spatial adaptations, said generate the adapted version of the video content, and said output the adapted version of the video content are performed subsequent to receipt of the request by the video adaptation target module.

3. The system as recited in claim 1, wherein the target content adaptations are defined based at least in part on determining whether the request was received from a video-enabled watch, mobile phone, tablet, or automobile entertainment system.

4. The system as recited in claim 1, wherein to access the video source, the video content adaptation generator is further configured to access a live content feed, and wherein the adapted version of the content that is output is an adapted version of the live content that is output in real-time or near-real-time with the request for the content.

5. The system as recited in claim 1, wherein said define the one or more target content adaptations is based at least in part on analysis of historical use patterns of one or more users.

6. A method, comprising:
   performing, by one or more hardware processors,
      receiving over a network, from a requesting device, a request for a video content;
      defining, subsequent to the request and based at least in part on contextual information that comprises one or more characteristics of the requesting device and analysis of historical use patterns of one or more users of the requesting device, types of modifications to perform on the requested video content, wherein the defined types of modifications include a spatial cropping modification, and a temporal cropping modification that alters a duration of a portion of the video content;
      modifying the requested video content according to the defined types of modifications, wherein modifying comprises applying the cropping modifications to produce modified content; and
      transmitting the modified content over the network in response to the request for the video content.

7. The method as recited in claim 6, wherein the contextual information used to determine a definition of the types of modifications includes a type of device the request is received from, and wherein said defining the one or more types of modification to perform on the requested video content includes determining a spatial or temporal modification to perform on the requested video content.

8. The method as recited in claim 7, wherein the type of device is a portable device and wherein the spatial and temporal modifications include a shortened and spatially cropped version of source content.

9. The method as recited in claim 6, further comprising:
obtaining one or more user-configurable preferences,
wherein said modifying the requested video content is based at least in part on the obtained user-configurable preferences.

10. The method as recited in claim 6, wherein said modifying the requested video content includes modifying a bit-rate or resolution or playback speed of the requested video content.

11. The method as recited in claim 6, further comprising:
prioritizing or classifying segments of the requested video to generate video prioritization or classification metadata;
wherein said defining the types of modifications includes determining a length of the modified video content based at least in part on the video prioritization or classification metadata, and
wherein said modifying the requested video content includes modifying the requested video content to the determined length.

12. The method as recited in claim 11, wherein said prioritizing or classifying segments of the requested video is configurable via user-configurable user preferences.

13. A non-transitory computer-readable medium storing program instructions that are executable by one or more processors to implement a contextual content adapter configured to:
receive over a network, from a requesting device, a request for a video content;
identify, subsequent to the receipt of the request, two or more distinct sources of video content to produce the requested video content;
define, subsequent to receipt of the request and based at least in part on contextual information that comprises one or more characteristics of the requesting device, one or more modifications to perform on the two or more distinct sources of video content, the one or more modifications comprising a spatial cropping modification that identifies an area of interest from each of the two or more distinct sources of video content, a temporal cropping modification that alters a duration of at least a portion of at least one of the two or more distinct sources of video content;
modify, via application of the one or more modifications, the two or more distinct sources of video content;
combine the modified two or more distinct sources of video content to produce the requested video content; and
send the requested video content over the network in response to the request for the video content.

14. The non-transitory computer-readable medium as recited in claim 13, wherein to define the one or more modifications, the program instructions are further executable to define the one or more modifications based at least in part on recognition of one or more scenarios, and wherein to modify the two or more distinct sources of video content, the program instructions are further executable to modify the requested video based at least in part on the recognized one or more scenarios.

15. The non-transitory computer-readable medium as recited in claim 13, wherein to modify the two or more distinct sources of video content the program instructions are further executable to modify the two or more distinct sources of video content prior to said combining the two or more distinct sources of video content.

16. The non-transitory computer-readable medium as recited in claim 13, wherein to modify the two or more distinct sources of video content, the program instructions are further executable to generate a plurality of shortened versions of at least one of the two or more distinct sources of video content based at least in part on information about the respective content from one or more content providers, or results from analysis of the respective content, wherein the information about the content or the results from the content analysis include a storyline from the content or a character's view point from the content.

17. The non-transitory computer-readable medium as recited in claim 13, wherein to modify the two or more distinct sources of video content the program instructions are further executable to generate a version of at least one of the two or more distinct sources of video content covering multiple sequels or a version mixed with multiple sequels.

18. The non-transitory computer-readable medium of claim 13, wherein to modify the two or more distinct sources of video content, the program instructions are further executable to modify the two or more distinct sources of video content based at least in part on social media data, user history, or user-configurable preferences.

19. The non-transitory computer-readable medium of claim 13, wherein to modify the two or more distinct sources of video content, the program instructions are further executable to generate a version of at least one of the two or more distinct sources of video content based on application of a policy to content metadata or to results of content analysis, the policy corresponding to the request.

20. The non-transitory computer-readable medium of claim 13, wherein the program instructions are further executable to implement a network condition module configured to determine network conditions of a network over which the requested content will be sent, and wherein the contextual information used to determine the one or more modifications to perform on the requested video content includes the determined network conditions.

* * * * *